United States Patent [19]

Sugisaw et al.

[11] Patent Number: 5,207,771

[45] Date of Patent: May 4, 1993

[54] RADIAL PLUNGER TYPE PUMP WITH COUNTER WEIGHT AND WASHER INTEGRALLY SECURED

[75] Inventors: Masakazu Sugisaw, Takahama; Yoshio Watanabe, Kariya, both of Japan

[73] Assignee: Aisin Seiki Kabushiki Kaisha, Kariya, Japan

[21] Appl. No.: 805,623

[22] Filed: Dec. 12, 1991

[30] Foreign Application Priority Data

Dec. 19, 1990 [JP] Japan .................. 2-411685

[51] Int. Cl.$^5$ .................. F01B 1/00; F04B 1/04
[52] U.S. Cl. .................. 92/72; 417/273
[58] Field of Search .................. 92/12.1, 72; 91/472, 91/473, 491, 493, 496; 417/273

[56] References Cited

U.S. PATENT DOCUMENTS

| | | | |
|---|---|---|---|
| 361,598 | 4/1887 | Rosenkranz | 92/72 X |
| 3,910,164 | 10/1975 | Swadner et al. | 417/273 X |
| 4,915,595 | 4/1990 | Nelson et al. | 417/273 |

FOREIGN PATENT DOCUMENTS 2206655 1/1989 United Kingdom .

Primary Examiner—Edward K. Look
Assistant Examiner—John Ryznic
Attorney, Agent, or Firm—Oblon, Spivak, McClelland, Maier & Neustadt

[57] ABSTRACT

A radial plunger type pump includes a housing, an eccentric cam shaft rotatably supported by the housing, a pair of bearings for supporting the cam shaft in the housing, a radial plunger reciprocally disposed in a cylinder of the housing and reciprocating within the cylinder of the housing in accordance with the eccentric rotation of a cam portion of the eccentric cam shaft. The pump further includes a pair of counterweights disposed in spaces provided between the bearings and the cam portion of the eccentric cam shaft, the pair of counterweights including a counterweight portion for balancing the rotation of the eccentric cam shaft and washer portion for preventing the plunger from axial movement wherein the counterweight portion and and washer portion are integrally secured and wherein the counterweights are engaged with the eccentric cam shaft for preventing the relative rotation therewith.

6 Claims, 4 Drawing Sheets

RADIAL PLUNGER TYPE PUMP WITH COUNTER WEIGHT AND WASHER INTEGRALLY SECURED

BACKGROUND OF THE INVENTION

1. Field of the Invention:

This invention relates to a radial plunger type pump and more particularly to radial plunger type pump which has a counterweight for balancing the rotation of the eccentric cam shaft of the pump.

2. Description of the Related Art

A conventional radial plunger type pump is disclosed in FIG. 7. An eccentric cam shaft 33 is pivotally supported by pump housing 30 by bearing means 31 and 32 and plunger 35 is slidably provided in the cylinder 36 of the housing 30 to reciprocate within the cylinder 36 by the rotation of the cam shaft 33. For balancing the rotation, a pair of counterweight 37 are secured to the cam shaft 33 and disposed between the cam portion 34 and the bearings 31 and 32. The counterweights also serve as washers for preventing the axial movement of the cam shaft 33.

The counterweights are secured to the cam shaft by bolts and it may be difficult to change the weight of the counterweights for adjusting the rotation of the cam shaft 33 or may be damaged by the bolts during the repetitive use.

SUMMARY OF THE INVENTION

Accordingly it is an object of the present invention to provide an improved radial plunger type pump.

According to the present invention, a radial plunger type pump comprising a housing, an eccentric cam shaft rotatably supported by the housing, a pair of bearing means for supporting the cam shaft in the housing, a radial plunger reciprocally disposed in a cylinder of the housing and reciprocating within the cylinder of the housing in accordance with the eccentric rotation of a cam portion of the eccentric cam shaft, a pair of counterweights disposed in spaces provided between the bearing means and the cam portion of the eccentric cam shaft, the pair of counterweights including a counterweight portion for balancing the rotation of the eccentric cam shaft and washer portion for preventing the plunger from axial movement wherein the counterweight portion and and washer portion are integrally secured and wherein the counterweights are engaged with the eccentric cam shaft for preventing the relative rotation therewith.

According to the present invention, the radial plunger type pump further includes the pair of counterweights having an engaging portions which engages with the eccentric cam shaft for preventing the relative rotation therewith. According to the present invention, the radial plunger type pump further includes the engaging portions of the pair of counterweights being radial projections provided in central bores and wherein the radial projections engage with grooved portions provided on the outer surface of the eccentric cam shaft for preventing the relative rotation therewith.

BRIEF DESCRIPTION OF THE DRAWINGS

A more complete appreciation of the invention and many advantages thereof will be readily obtained as the same becomes better understood by reference to the following detailed description when considered in connection with the attached drawings, wherein.

DETAILED DESCRIPTION OF THE PREFERRED EMBODIMENTS

Figure 1:
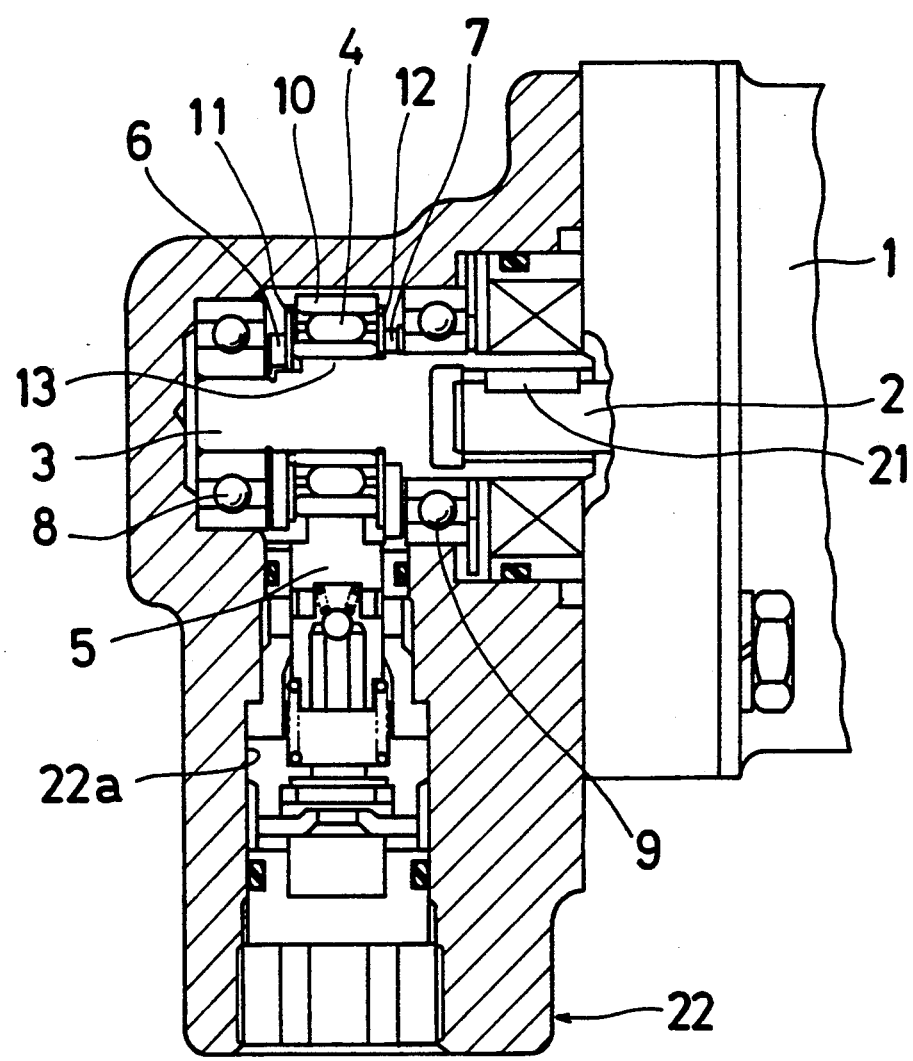
FIG. 1 is a cross-sectional view of a radial plunger type pump according to the embodiment of the present invention.
Figure 2:
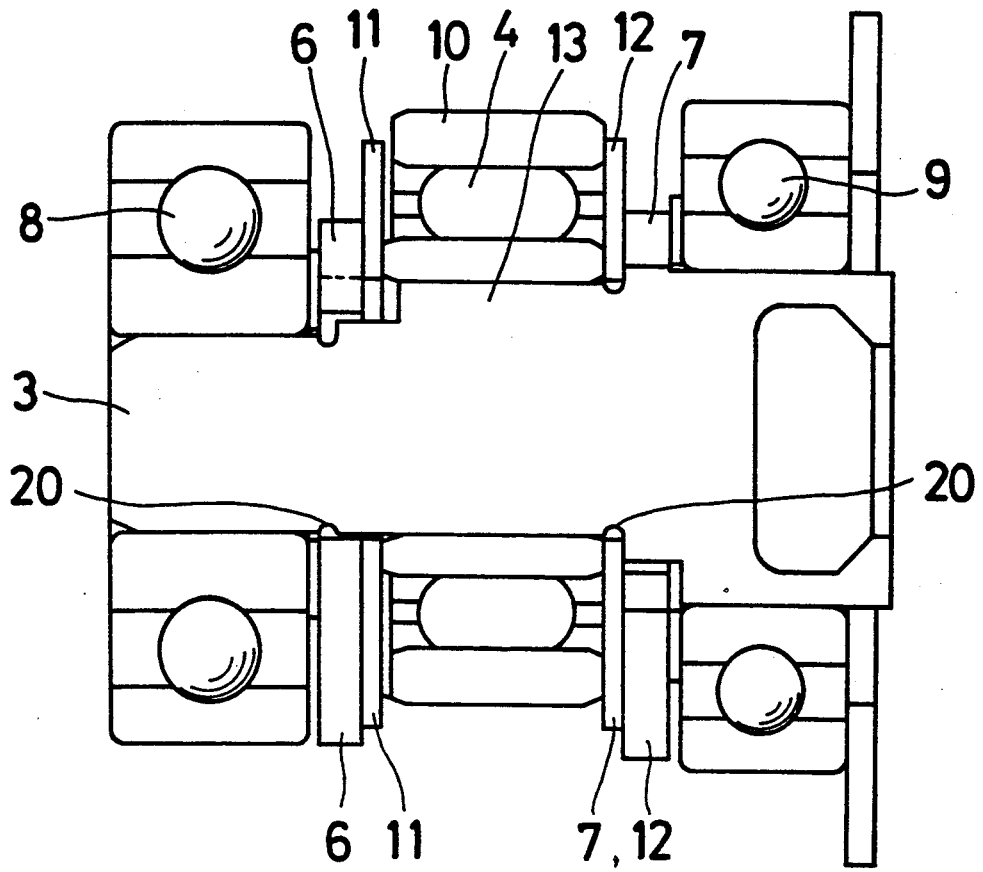
FIG. 2 is an enlarged schematic view of bearing portion of the radial plunger type pump according to the embodiment of FIG. 1.

Referring now to FIGS. 1 and 2 wherein a radial plunger type pump of the embodiment of the invention is shown. Numeral 1 designates a motor for the radial plunger type pump. The motor 1 is operatively connected to a motor shaft 2 to which an eccentric cam shaft 3 is connected for unitary rotation therewith by means of key member 21.

The eccentric cam shaft 3 is pivotally mounted on pump housing 22 by ball bearings 8 and 9. A needle bearing 4 is mounted on the eccentric cam shaft 3 and outer ring 10 of the needle bearing 4 engages with one end of a radial plunger 5 which is provided in a cylindrical portion 22a of the housing 22 and is effecting pumping operation by reciprocating within the cylindrical portion 22a. Spaces are provided between both sides of cam portion 13 of the cam shaft 3 and each bearing 8 and 9 for disposing each set of weight washers 6, 11 and 7, 12. The weight washers are non-rotatably attached to the cam shaft 3.

Figure 3:
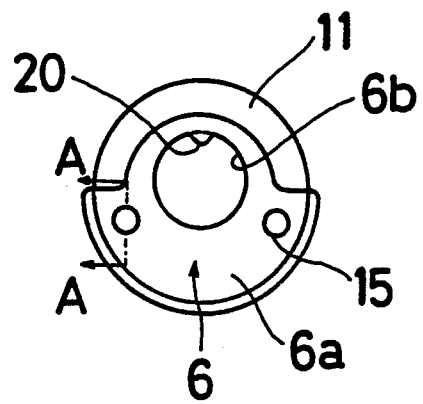
FIG. 3 is a front view of a first set of weight washers used in the pump of FIG. 1.
Figure 4:
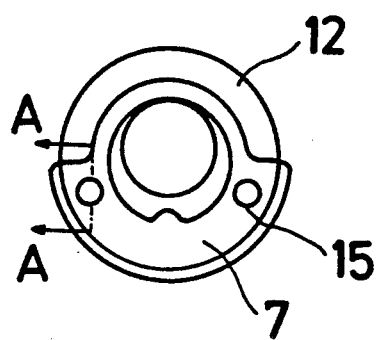
FIG. 4 is a front view of a second set of weight washers used in the pump of FIG. 1.
Figure 5:
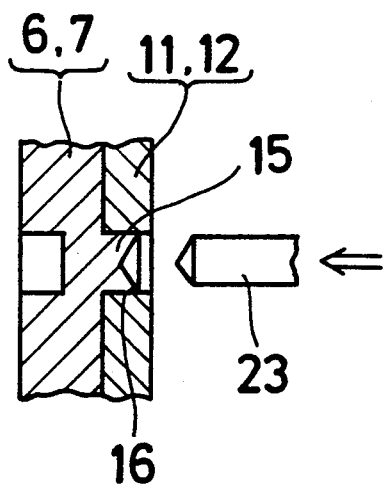
FIG. 5 is a cross-sectional view taken along the line A—A of FIGS. 3 or 4 showing the assembling means for weight washers into the pump.
Figure 6:
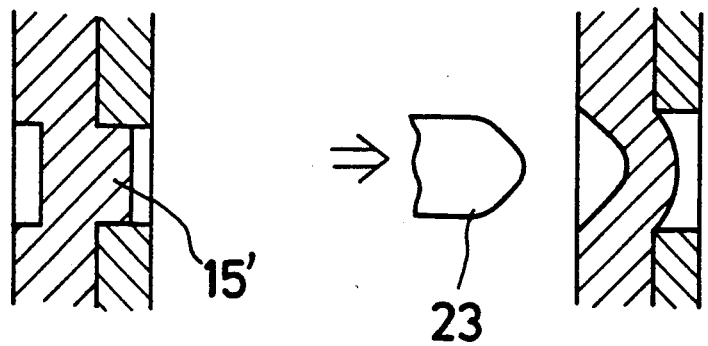
FIG. 6 is a view similar to FIG. 5, but showing another way of assembling the weight washers into the pump.
Figure 7:
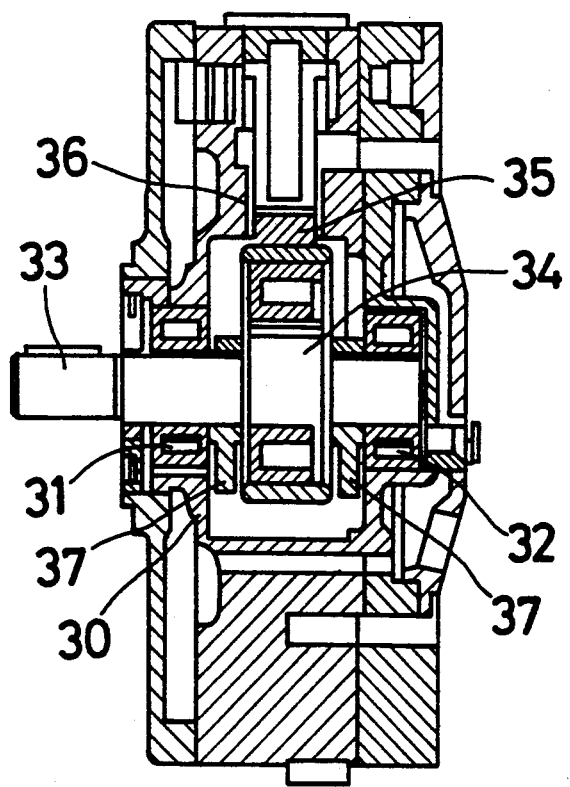
FIG. 7 is a cross-sectional view of a conventional radial plunger type pump.

Referring now to FIGS. 3, 4 and 5, wherein a weight washer 6 has a large diameter portion 6a for serving as a weight, an inward (radial) projection 20 at a bore 6b and as clearly shown in FIG. 5, a vertical (axial) projection 15 with respect to the surface of the washer 6. The projection 15 is inserted into a bore 16 provided in the washer 11 for securing the two washers tightly by using a jig 23. The washers 7 and 12 are similarly secured by the jig 23. Securing the washers may be carried out in a different way, such as for example, by pressing the projection 15' by punching as shown in FIG. 6. The inward projection 20 serves for preventing the relative rotation with the cam shaft 3 by engaging the projection 20 with a groove (not shown) provided in the cam shaft 3.

Thus, the weight washers serving as a counterweight to balance the rotation of cam shaft 3.

The needle bearing 4 is prevented from the axial movement by the washers 6,7, 11 and 12 for smooth rotational operation.

The counterweights and washers are integrally formed without using any bolts. The weight may be easily changed by changing the thickness of the washers. Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A radial plunger type pump comprising:
   a housing;
   an eccentric cam shaft rotatably supported by the housing;
   a pair of bearing means for supporting the cam shaft in the housing;
   a radial plunger reciprocally disposed in a cylinder of the housing and reciprocating within the cylinder of the housing in accordance with the eccentric rotation of a cam portion of the eccentric cam shaft;
   a pair of counterweights disposed in spaces provided between the bearing means and the cam portion of the eccentric cam shaft, the pair of counterweights including a counterweight portion for balancing the rotation of the eccentric cam shaft and a washer portion for preventing the plunger from axial movement, wherein the counterweight portion and washer portion are integrally secured, wherein the counterweights are engaged with the eccentric cam shaft for preventing the relative rotation therewith, wherein the pair of counterweights have an engaging portion which engages with the eccentric cam shaft for preventing the relative rotation therewith, wherein the engaging portions of the pair of counterweights are radial projections provided in central bores and wherein the radial projections engage with grooved portions provided on the outer surface of the eccentric cam shaft for preventing the relative rotation therewith.

2. A radial plunger type pump of claim 1, wherein the counterweight portion includes an axial projection which engages with the washer portion for riveting the two portions tightly.

3. A radial plunger type pump of claim 1, wherein the counterweight portion includes an axial projection which engages with the washer portion for punching the two portions to secure the same tightly.

4. A radial plunger type pump of claim 1, wherein a needle bearing means is provided on the eccentric cam shaft and includes an outer ring which is in contact with the plunger for reciprocating in accordance with the rotation of the eccentric cam shaft.

5. A radial plunger type pump of claim 4, wherein the eccentric cam shaft is connected to a motor shaft which in turn is connected to a motor for rotating the eccentric cam shaft.

6. A radial plunger type pump of claim 4, wherein the outer ring of the needle bearing is limited in axial movement by the washer portions of the pair of counterweights.

* * * * *

UNITED STATES PATENT AND TRADEMARK OFFICE
CERTIFICATE OF CORRECTION

PATENT NO. : 5,207,771

DATED : May 4, 1993

INVENTOR(S) : Masakazu Sugisawa et al.

It is certified that error appears in the above-identified patent and that said Letters Patent is hereby corrected as shown below:

On the title page, Item [19] and [75],

The first inventor's name is incorrect, should read:

--[19]   Sugisawa et al.--

--[75]   Masakazu Sugisawa--

Signed and Sealed this

Fourth Day of January, 1994

Attest:

BRUCE LEHMAN

Attesting Officer

Commissioner of Patents and Trademarks